Figure 1:
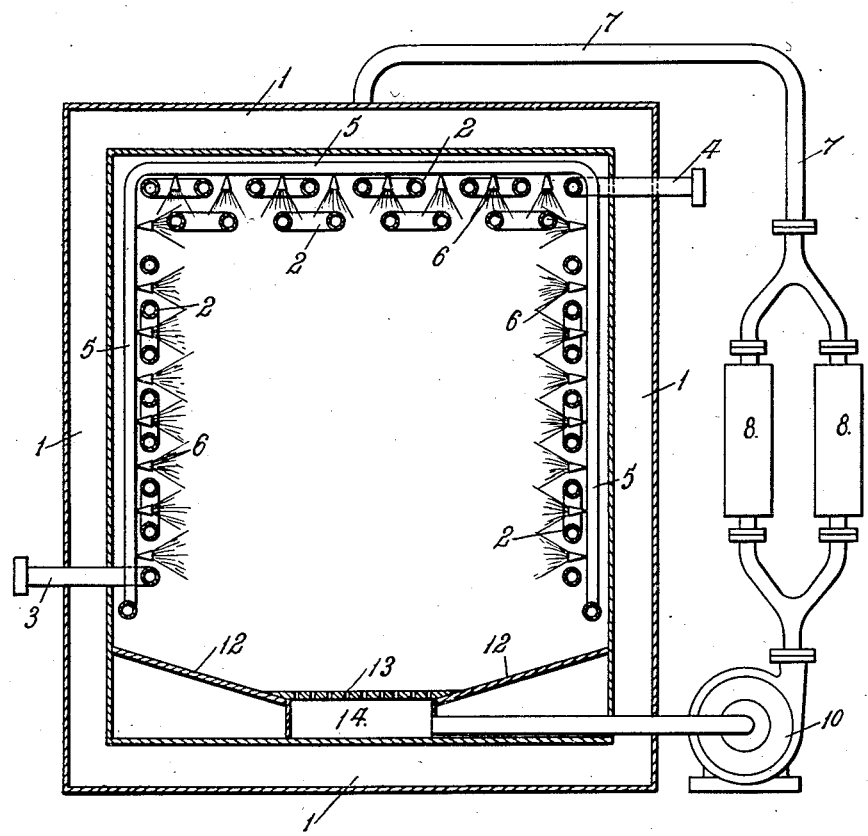

Jan. 17, 1933.    M. T. ZAROTSCHENZEFF    1,894,813
MEANS AND METHOD FOR CHILLING AND FREEZING FOODSTUFFS
Filed Feb. 17, 1931    2 Sheets-Sheet 1

INVENTOR
M. T. ZAROTSCHENZEFF
By  [signature]  ATTY.

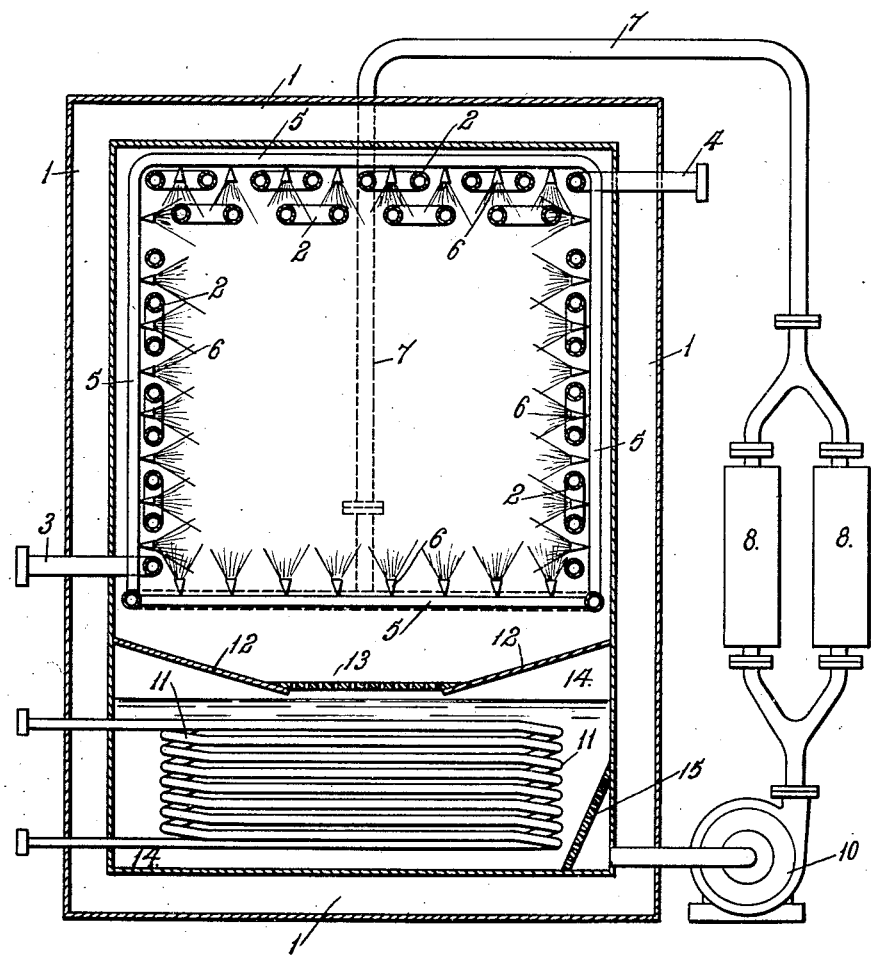

Patented Jan. 17, 1933

1,894,813

UNITED STATES PATENT OFFICE

MIKAIL TROFIM ZAROTSCHENZEFF, OF LONDON, ENGLAND, ASSIGNOR TO AMERICAN "Z" CORPORATION, OF NEW YORK, N. Y., A CORPORATION OF NEW YORK

MEANS AND METHOD FOR CHILLING AND FREEZING FOODSTUFFS

Application filed February 17, 1931, Serial No. 516,441, and in Great Britain July 15, 1930.

This invention has reference to the system of rapidly chilling or freezing (and thawing or de-frosting) foodstuffs, by subjecting them to an artificially cold atmosphere of fog and air, the fog being preferably produced by atomizing or pulverizing a suitable liquid to a fine state of division so that it is brought to this condition; and by it the thermal conductivity of the atmosphere is increased very much, and the chilling or freezing effect is rendered rapid and highly efficient.

In the system of this character as hitherto proposed, the practise has been to refrigerate the liquid used to form the fog, say brine, or water, or any liquid suitable to the purpose; and in the treatment fine particles of the fog coalesce and form drops which fall down in the refrigerating chamber, and pass to a refrigerating apparatus, and the liquid so formed is returned to the chamber, and re-atomized in the chamber by the atomizing devices, of which there may be a large number suitably distributed. By this means the low temperature of the atmosphere required in the chamber has been proposed to be maintained.

In the system or method according to the present invention, the fog atmosphere is maintained at the low temperature required within the chamber, wholly or largely, by extracting from it the heat which is continuously being absorbed by it by coming in contact with the food articles or material being chilled or frozen, by the employment within the chamber itself of a large area of cooling surface, i. e. pipes or conduits through which an artificially refrigerated fluid, say an expanded gas or other fluid is passed; and the fog atmosphere is caused to circulate and be in continuous movement or flow, so that the heat of the foodstuffs which is extracted from them by the flow or streams of the fog atmosphere which is continuously being passed over them is in passing over and in contact with the cooling surfaces absorbed; and thereby the articles rapidly chilled or frozen, the degree of rapidity depending to a substantial extent on the velocity of flow of the fog and its uniform distribution, the wetness of the fog promoting the rapid and efficient transfer of heat from the foodstuffs and from the atmosphere to the cold fluid within the pipes or conduits.

The multiplicity or distributed and directed streams or jets of atomized liquid issuing from the atomizing nozzles or devices provided and distributed on the different liquid supply pipes in the chamber, and adapted to create streams in different directions, ensure that the whole of the surfaces of the food (or enclosure containing it) will be subjected to contact and impingement of these rapidly flowing streams of cold wet fog, which produces a rapid chilling or freezing effect.

During the treatment, some of the fine particles of the fog coalesce and form drops of liquid by coming in contact with the surface of the foodstuffs to be chilled or frozen or otherwise, and these fall to the bottom of the chamber, and the liquid so formed is carried away, and is preferably purified or sterilized or both, and returned under pressure and forced through the nozzles in the chamber, and re-atomized by them into the form of fog.

This coalescing of the fog particles partly takes place on the surface of the goods being treated, in which a thin film of liquid will be formed, and always present; and as the drops of liquid form, they will fall down in the chamber as described.

The effectiveness of the wet fog atmosphere depends in a substantial measure upon the impingement of flow of the streams or circulation of the wet cold fog over the surface of the foodstuff (or its container), their equal distribution, and the rate of flow, whether such flow or circulation is produced by the atomized jets, or circulation otherwise produced; and further by this movement, circulation or commotion of the atmosphere in the chamber, it is always flowing over or being brought into contact with and near the cold pipe or conduit surfaces, and heat in it extracted.

In special cases the freezing or chilling of foods may not be required to be so rapid, in which case the movement or flow of the fog atmosphere over the foodstuffs and cooling pipe or conduit surfaces may be effected wholly or mainly by convection currents only, so that in such a case the manner of distribution of the atomizers specified is not necessary.

With regard to the thawing or de-frosting of frozen articles of food and to this invention, it is only necessary in order to apply it, to use warm liquid for the nozzles, or warm fluid in the pipes within the chamber, or both, similarly as the cold liquids or fluids are used in the chilling or freezing action.

In some cases, if desirable, instead of the liquid for producing the fog being the same, used over and over again, fresh liquid may be employed; or this liquid may consist partly of fresh liquid and partly of that passing away from the chamber.

According to a modified manner of producing the degree of temperature required in the chamber, and maintaining it, the water, or brine or other liquid which is forced into the chamber and converted to the fine fog condition, is refrigerated artificially prior to being atomized to the low temperature required, and converted to the fog condition; and thus the maintenance of the required low temperature in the chamber effected, partly by the cold pipe or conduit surface of the chamber, and partly by refrigerating the liquid to be atomized.

When the degree of cold required is maintained by the cold pipe surfaces or conduits alone, a large surface is required, say lining of pipes or conduits on the side or end walls, and roof and floor of the chamber, such for instance in the manner and amount indicated by the piping presented in the drawings hereinafter described, which illustrate the invention.

By delivering a multiplicity of sprays of atomized liquid into the chamber at a large number of points, a rapid circulation and movement of the atmosphere in the whole of the interior of the chamber will be produced, and thus the fog atmosphere which has been in contact with the articles to be chilled or frozen will be quickly passed over the cold pipe or conduit surface, and by the actual presence of fog or wetness in the atmosphere the conductivity of the atmosphere is much increased, the heat will rapidly be transferred to the cold pipe surface and fluid within it, and chilling and freezing rendered very rapid.

In the case where the fish is to be rapidly frozen, the temperature of the fog atmosphere may be about from −20° C. to −22° C.

When the liquid is forced through the atomizing nozzles, the pressure of liquid applied to them should be such as to produce the fog state of division specified.

When rapid chilling of the goods only is required, it can be effected by means of cold water or other suitable liquid, cooled to a temperature near zero C., in which case the food to be chilled is subjected to the atmosphere of fog as described, until the heat of the food is completely carried off; and this chilling can be accomplished by cold clean water, without admixture of any chemical substances, which are liable of producing change of appearance, taste or smell. This manner of accomplishing this effect is advantageous.

When the articles have become frozen or chilled they are removed from the treating chamber, and a fresh quantity to be frozen or chilled is introduced.

Figure 1 is a sectional view showing diagrammatically a form of the invention. Figure 2 is a similar view showing a modification of the apparatus.

Referring to the drawings, the walls, ceiling and floor of the chamber are marked 1, and they may be assumed to be suitably insulated. 2 are pipe surfaces on the sides and roof of the chamber—and may be end walls of the chamber—through which a refrigerating fluid is circulated, being introduced by the pipe 3, and discharged and carried away by the discharge branch 4.

5 are the pipes by which the water or liquid to be atomized in the chamber is conveyed into same, and on which the multiplicity of atomizing nozzles 6 are fixed; and as may be understood, there may be a plurality of sets of these pipes 5, arranged in parallel along the sides and roof at spaced distances.

Liquid is supplied to the pipes 5 by a pipe 7 which is connected with the delivery part of the liquid filters 8, to which the returned liquid from the chamber is forced by the force pump 10.

In Figure 1, the chamber is adapted to be chilled, and maintained at the temperature required wholly by the cold surfaces of the pipes 2, and the drops of liquid produced by the coalescing of fog particles on the articles fall on to a floor 12 which slopes to the centre, at which a perforated plate 13 is provided, which constitutes a strainer; and the returned liquid passes through the receptacle 14 on its way to the pump 10, which circulates it, and forces it forward at the required pressure for atomization. The liquid may pass from the receptacle 14 through a strainer 15 to the pump.

It will be seen that on the roof portion of the chamber there are two sets of coils or pipes 2 in parallel arrangement.

The manner of supporting the foodstuffs to be treated, depends upon the character as will be evident, as for instance it may be suspended or carried in trays or horizontal supports, or the articles may hang on horizontal rods, or in any way appropriate to the article to be treated, care being taken that the streams of cold wet fog flowing through and about the chamber would be caused to pass in contact with the articles being treated.

In the case of the goods being carried in closed containers the freezing or refrigerating operation would be an indirect one, and in such cases the brine or liquid used may be calcium chloride brine which congeals at a low temperature, compared with sodium chloride brine usually used for direct contact freezing.

With regard to the atomizers 6, on the liquid being discharged from them at a high pressure, it loses this pressure, and is transformed into small particles, which fill the chamber with the cold fog and wet atmosphere, which envelops the food substances to be treated, abstracting their heat.

All the pipes outside the chamber will be suitably insulated.

In the case where the articles to be preserved are frozen through by subjecting them to the action of the fog atmosphere at a low temperature (−20° C. to −25° C.), they may in some cases be provided with a covering of ice over their surface, that is, they are glazed with ice, and this may be produced by dipping or washing them in or otherwise applying to their surface fresh water which becomes frozen by the low temperature of the frozen article. When this is applied to fish this operation constitutes a washing in fresh water; and prior to this treatment the adhering brine or liquid is removed by washing off in or by fresh water at say a temperature of about 20° C.

Figure 2 illustrates the case when the cold is produced partly, and it may be mainly, by the action of the cold surfaces of the pipes 2, and partly by refrigerating the liquid which is atomized and forms the sprays or streams of fog atmosphere, in which case the liquid falling to the bottom of the chamber flows into a chamber or tank 14 containing a body of the liquid, in which is immersed a refrigerator 11 consisting of a nest of pipes, through which expanded ammonia or other refrigerating or cold producing fluid is passed.

With regard to the application of the invention to the defrosting or thawing of food substances such as referred to, this is accomplished by subjecting the frozen articles to the action of the finely atomized liquid in the form of fog at a temperature above freezing, the formation of the fog being effected by atomizing it as described in connection with the chilling or freezing process; and by allowing the articles of food to remain in this fog laden air or atmosphere, the articles are rapidly thawed or de-frosted. The atmosphere used is sterilized and purified as described in connection with the freezing of articles of food. The result of this de-frosting or thawing process is that the fish or food, after the operation, is practically unaltered from its state at the moment of freezing, and its appearance and flavour the same as those of freshly caught fish, or freshly killed meats.

With regard to the rapid chilling of articles of food, this can be effected by using water artificially cooled down to a temperature near zero centigrade.

While the invention has been described as applied more especially to the rapid freezing or chilling of flesh food substances it can also be applied to the freezing or chilling of fruits and vegetables and other edibles, which it is desired to preserve, including such articles as ice-creams or similar confections; and while in some cases these articles of food are frozen or chilled by being subjected to direct contact by the rapid flowing streams of fog atmosphere passed over them, in other cases the food articles or stuffs may be held within containers, which will be subjected to the streams of freezing or chilling fog atmosphere. In such cases the containers may be of free openwork or meshwork material so that the flowing fog atmosphere can come into direct contact with the goods, and thus they would be chilled or frozen. The same effect would take place if the goods were in suitable boxes or containers filled with food and subjected to the action of the streams of fog atmosphere; but in such cases, the material of the container must be of such a character, or of such thickness that it will not impede to a serious extent the transference of heat between the contents, and the enveloping atmosphere.

In some cases there may be employed in the chamber a number of superposed horizontal cooling pipe grids, which can be arranged to form shelves or supports for trays or the like, for supporting the articles to be treated.

By the terms "food", "edible products", etc. as herein used in the specification and claims, is meant all animal, vegetable, and fruit products in connection with which the invention can be advantageously employed. By the term "fog" is meant atomized refrigerating liquid of a fineness not likely to penetrate the products to be refrigerated under the velocity with which it is directed against said products.

In the case of hams, bacon, and the like being frozen or chilled, there may be used in connection or combination with the liquid being atomized and employed in the chamber, a small quantity of saltpetre, sodium nitrite or nitrate, or other analogous substance, by which the goods are improved in appearance and colour, namely, they are rendered bright and ruddy looking.

In the case of treating fruit and berries under this invention, there may be used in connection with the liquid to be atomized and formed into fog, saccharine matter or solution, such as a solution of syrup, sugar, molasses, or glucose; and also flavourings such as are usually used in connection with different foodstuffs, including spices and seasonings, may be employed. Thus, the fruit so treated would possess an added pleasant flavour.

What is claimed is:—

1. A method for refrigerating edible products, which consists in first chilling the air and the edible products in the chamber containing said products by convection currents, then introducing into said chamber a refrigerant of very low temperature in the form of dense fog to freeze the edible products, and cooling the air and dense fog in the chamber as the same absorbs heat from the edible products being frozen.

2. A method for refrigerating edible products, comprising directing a refrigerant in the form of a dense fog against the edible products in the refrigerating chamber, and withdrawing from the fog in the chamber the heat absorbed by the fog through contact with the edible products being refrigerated.

3. A method for refrigerating edible products, which consists in first chilling the air and the edible products in the chamber containing said products by convection currents, then introducing into said chamber and directing upon the edible products a medium of a very low temperature in the form of a dense fog to freeze the edible products, and abstracting the heat absorbed by the chilled air and the dense fog as the same absorbs the heat from the edible products being frozen.

4. A method for refrigerating edible products, which consists in subjecting the edible products in a chamber to the action of chilled air and also of a dense fog comprising a medium of low temperature and withdrawing from the air and dense fog in the chamber the heat absorbed from the edible products as they are being frozen.

5. A refrigerating system of the class described comprising a chamber in which edible products may be disposed, refrigerating coils suitably disposed in said chamber through which a refrigerant may be circulated, other coils containing refrigerant under pressure also suitably disposed in said chamber and provided with nozzles arranged to discharge against the edible products therein, said nozzles being adapted to finely atomize the refrigerant discharged therefrom, or reduce it to a fog, which is circulated through the chamber and around the products contained therein.

In testimony whereof I have signed my name to this specification.

M. T. ZAROTSCHENZEFF.